United States Patent [19]
Gilbert et al.

[11] Patent Number: 6,095,178
[45] Date of Patent: Aug. 1, 2000

[54] SYSTEM FOR MONITORING AND CONTROLLING THE LEVEL OF A LIQUID IN A CLOSED CONTAINER

[75] Inventors: Paul A. Gilbert; Terry V. Jobe; Johnny Lee Morrow, all of Vicksburg; Thomas Vertis McEwen, Summit, all of Miss.

[73] Assignee: U.S. Army Corps of Engineers as represented by the Secretary of the Army, Washington, D.C.

[21] Appl. No.: 08/929,255

[22] Filed: Sep. 15, 1997

[51] Int. Cl.⁷ .............................. F16K 31/04; F16K 31/12
[52] U.S. Cl. .......................... 137/199; 137/197; 137/392; 73/304 R
[58] Field of Search ..................................... 137/199, 206, 137/209, 386, 392, 171, 177, 178, 187, 188, 197; 73/304 R, 304 C, 3 B

[56] References Cited

U.S. PATENT DOCUMENTS

| | | | |
|---|---|---|---|
| 2,411,986 | 12/1946 | Cowherd | 137/199 |
| 3,279,379 | 10/1966 | Klyce | 137/392 |
| 3,342,204 | 9/1967 | Royce | 137/199 |
| 3,416,547 | 12/1968 | Glenn, Jr. et al. | 137/171 |
| 3,481,350 | 12/1969 | Chamberlain | 137/209 |
| 3,599,666 | 8/1971 | Curtis et al. | 137/391 |
| 3,743,444 | 7/1973 | Kazama et al. | 417/92 |
| 3,922,564 | 11/1975 | Kachuk et al. | 137/392 |
| 4,061,442 | 12/1977 | Clark et al. | 137/392 |
| 4,120,656 | 10/1978 | Henningsen | 422/28 |
| 4,182,363 | 1/1980 | Fuller | 137/392 |
| 4,576,552 | 3/1986 | Smith. | 137/209 |
| 4,715,398 | 12/1987 | Shouldice et al. | 137/171 |
| 4,879,902 | 11/1989 | Loniello | 137/392 |
| 5,511,950 | 4/1996 | Agata | 417/36 |
| 5,544,672 | 8/1996 | Payne et al. | 137/187 |
| 5,771,917 | 6/1998 | Carney et al. | 137/392 |
| 5,871,028 | 2/1999 | Liu | 137/392 |

*Primary Examiner*—George L. Walton
*Attorney, Agent, or Firm*—Luther A. Marsh

[57] ABSTRACT

A system for monitoring and controlling the level of liquid in a closed container includes a block for mounting at an upper end of the container, a lower level electrode for extending from the block vertically into the container, an upper level electrode for extending from the block vertically into the container and shorter than the lower level electrode, a valve for venting gas from the container, and a motor for driving the valve. Electric circuitry is responsive to liquid in the container rising to a free end of the upper level electrode to activate the motor to close the valve to increase gas pressure in the container to force lowering of the level of the liquid, and further electrical circuitry is responsive to the liquid in the container dropping below a free end of the lower level electrode to activate the motor to open the valve to vent the container and reduce gas pressure therein to permit rising of the liquid level.

12 Claims, 1 Drawing Sheet

SYSTEM FOR MONITORING AND CONTROLLING THE LEVEL OF A LIQUID IN A CLOSED CONTAINER

BACKGROUND OF THE INVENTION

1. Field of the Invention

The invention relates to liquid level control systems and is directed more particularly to a system for monitoring and controlling the level of a liquid in a closed and pressurized container.

2. Description of the Prior Art

It is known in the art to use containers known as "clarifiers" for removing toxins from water. Typically, the container is closed and partially filled with contaminated water, which is continuously flowed through the container. Ozone gas ($O_3$) is bubbled up through the water to destroy contaminants in the water. It is desired that a substantially stable water level be maintained during the bubbling process. Unfortunately, as the ozone gas accumulates in the head portion of the container and the ozone pressure increases, the pressure drives ever lower the surface of the water in the container.

Accordingly, there is a need for a system which controls the level of the water in the container and, more specifically, which controls the gas pressure within the head portion of the container so that the gas pressure encourages stability in the water level.

SUMMARY OF THE INVENTION

It is, therefore, an object of the invention to provide a system for monitoring and controlling liquid level in a closed container in which gas under pressure is present.

With the above and other objects in view, as will hereinafter appear, a feature of the present invention is the provision of a system for monitoring and controlling the level of a liquid in a closed container, the system comprising a block for mounting at an upper end of the container, a lower level electrode for extending from the block vertically into the container, an upper level electrode for extending from the block vertically into the container and shorter than the lower level electrode, a valve for venting gas from the container, and a motor for driving the valve. The system further includes means responsive to liquid in the container rising to a free end of the upper level electrode to activate the motor to close the valve to increase gas pressure in the container to force lowering of the level of the liquid, and means responsive to the liquid in the container dropping below a free end of the lower level electrode to activate the motor to open the valve to vent the container and reduce gas pressure therein to permit rising of the liquid level, The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWING

Reference is made to the accompanying drawing in which is shown an illustrative embodiment of the invention, from which its novel features and advantages will be apparent.

In the drawing.

DESCRIPTION OF THE PREFERRED EMBODIMENT

Figure 1:
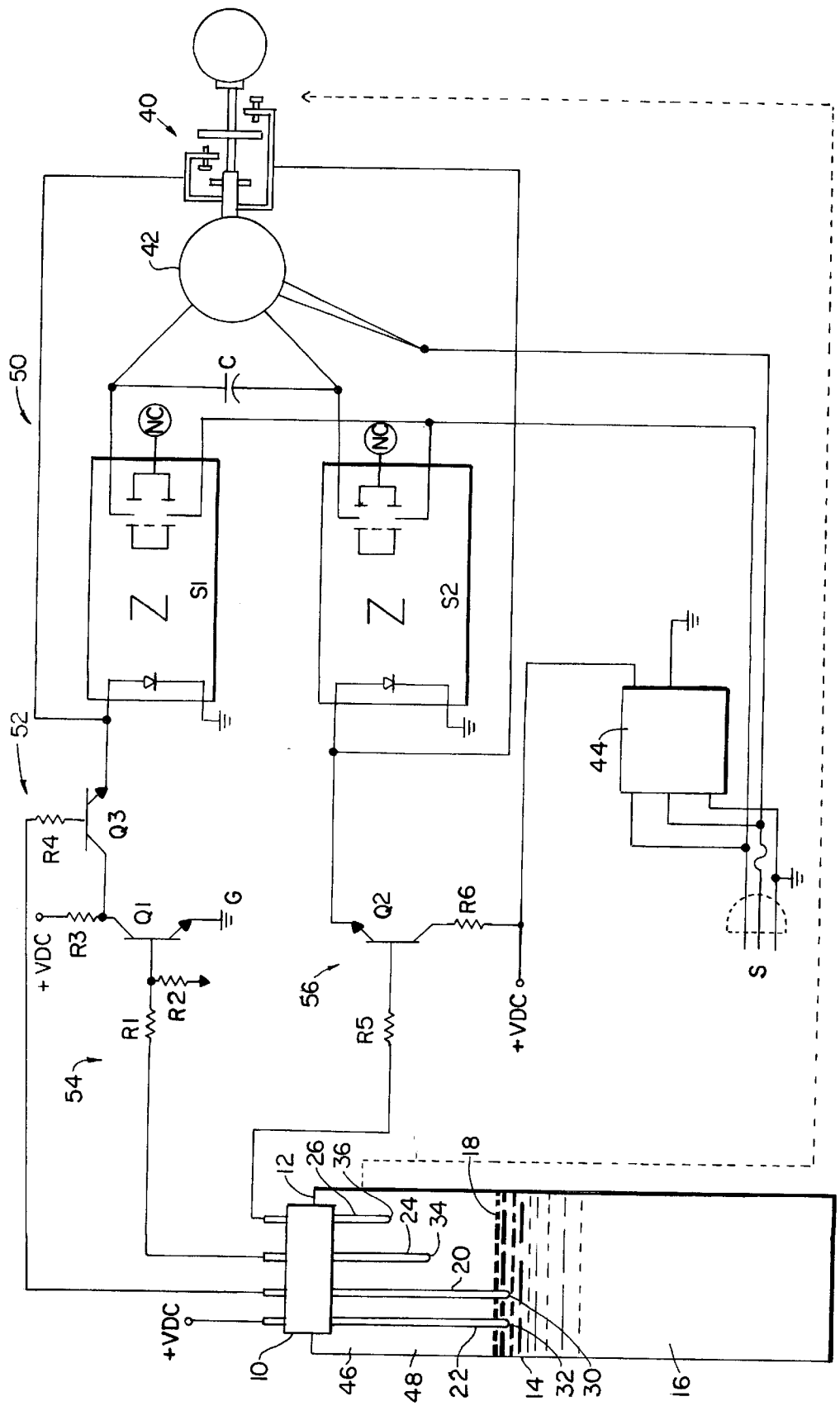
FIG. 1 is a schematic diagram of one form of system illustrative of an embodiment of the invention.

Referring to FIG. 1, it will be seen that the illustrative system includes a block 10 for mounting at an upper end 12 of a closed container 14 having liquid 16 therein defining a liquid surface, or level 18. A "turn-on" electrode 20 is mounted on the block 10 for extending from the block 10 vertically into the container 14. A common electrode 22 is also mounted on the block 10 for extending from the block 10 vertically into the container 14. The turn-on electrode 20 and the common electrode 22 are of substantially equal length.

The system further includes a lower level electrode 24 mounted on the block 10 for extending from the block 10 vertically into the container 14, and an upper level electrode 2 mounted on the block 10 for extending from the block 10 vertically into the container 14. The lower level electrode 24 is shorter in length than the turn-on and common electrodes 20, 22, and the upper level electrode 26 is shorter in length than the lower level electrode 24. Thus, free ends 30, 32 of the turn-on and common electrodes 20, 22, respectively, are deeper in the container 14, than is a free end 34 of the lower level electrode 24 which, in turn, is deeper in the container 14 than is a free end 36 of the upper level electrode 26.

The system further includes a valve 40 in communication with the container 14 for venting gas from the container, an electric motor 42 for driving the valve 40 between open and closed positions, and a power source 44 for driving the motor 42. The valve 40 is in communication with the container 14 at a level disposed within the length of the upper level electrode 36.

The system includes an electrical circuit 50 including first electrical circuit means 52 operative, upon the liquid surface 18 in the container 14 reaching the free ends 30, 32 of the turn-on and common electrodes 20, 22, to turn on the motor 42 and activate the motor 42 to turn in a first direction, typically counter-clockwise, to move the valve 40 toward a fully open position, to vent gas 46 from the container 14, thereby lowering the gas pressure in a head portion 48 of the container 14, and permitting the liquid level 18 therein to rise.

The first electrical circuit means 52 includes a resistor R4, which receives electrical current from the turn-on electrode 20, a transistor Q3, which is turned on by current from the resistor R4, a resistor R3, which receives current from the transistor Q3, and a switch S1, which receives current from the transistor Q3 and, in response thereto, is operative to turn on the motor 42. The motor is activated in the aforesaid first direction to open the valve 40 to permit rising of the liquid level 18.

The electrical circuit 50 includes a second electrical circuit means 54, operative, upon the liquid 16 in the container 14 reaching the free end 34 of the lower level electrode 24, to turn off the motor 42. The second electrical circuit means 54 includes a resistor R1 through which current flows when the liquid level 18 in the container 14 engages the free end 34 of the lower level electrode 24, to turn on a transistor Q1, permitting current to flow through the resistor R3 and through the transistor Q1 to ground G. to initiate turning off of the motor 42. The second electrical circuit means 54 further includes a resistor R2 through which bias voltage from the base of the transistor Q1 is discharged to ground.

The electrical circuit 50 includes a third electrical circuit means 56, operative upon the liquid 16 in the container 14 reaching the free end 36 of the upper level electrode 26, to turn on the motor 42 and activate the motor to turn in a second direction, such as clockwise, to move the valve 40 to a closed position to allow gas pressure in the container head portion 48 to increase, to push the level 18 of the liquid in the container 14 downwardly, toward the lower level electrode free end 34. The third electrical circuit means 56 includes a resistor R5 through which current flows when the liquid level 18 engages the free end 36 of the upper level electrode 26, a transistor Q2 turned on by current flowing through the resistor R5, a resistor R6 through which current from the transistor Q2 flows, and a switch S2 through which current from the transistor Q2 flows for the activation of the motor 42, for moving the valve 40 to the closed position. A phasing capacitor C maintains current flow properly phased to ensure turning of the motor 42 in proper directions.

When the liquid surface 18 descends below the free end 36 of the upper level electrode, the aforementioned third electrical circuit means 56 is operative to stop the motor 42, leaving the valve 40 closed. More specifically, current ceases to flow through the resistor R5, turning off the transistor Q2, thereby turning off the switch S2 to stop the motor 42.

When the liquid surface 18 in the container 14 drops below the free end 34 of the lower level electrode 24, the aforesaid second electric circuit means 54 is operative to start the motor 42 turning in the first direction to move the valve 40 toward an open position to vent gas from the container 14. More specifically, the liquid level 18 dropping from contact with the free end 34 of the lower level electrode 24 stops current flow through the resistor R1, to turn off the transistor Q1, to flow current through the resistor R3, the transistor Q3 and the switch S1 to activate the motor 42. The bias voltage from the base of the transistor Q1 is discharged to ground through the resistor R2 as probe L loses contact with the fluid, thus assuring that the transistor Q1 turns off quickly.

When the liquid surface 18 in the container 14 drops below the free ends 30, 32 of the turn-on and common electrodes 20, 22, communication between the power source 44 and the motor 42 is interrupted, stopping the motor 42 with the valve 40 in the open position, permitting venting of gas and rising of the liquid level 18.

There is thus provided a system for monitoring and controlling liquid level in a closed container in which gas under pressure is present.

It is to be understood that the present invention is by no means limited to the particular construction herein disclosed and/or shown in the drawings, but also comprises any modifications or equivalents within the scope of the claims. While it is contemplated that the invention herein will find utility in the control of water levels in clarifiers, it will be apparent to those skilled in the art that the invention is equally applicable to any container wherein it is desired to maintain a stable liquid level in the presence of gas under pressure.

What is claimed is:

1. A system for monitoring and controlling the level of a liquid in a closed container in which a gas is bubbled up through the liquid, the system comprising:

a block for mounting at an upper end of the container;

a lower level electrode for extending from said block vertically into the container;

an upper level electrode for extending from said block vertically into the container and shorter than said lower level electrode;

a valve for venting the gas from the container;

a motor for driving said valve;

first means responsive to liquid in the container rising to a free end of said upper level electrode to activate said motor to close said valve to permit increase of gas pressure in the container to force lowering of the level of the liquid;

second means responsive to the liquid in the container dropping below a free end of said lower level electrode to activate said motor to open said valve to vent the container and reduce gas pressure therein to permit rising of the level of the liquid.

2. The system in accordance with claim 1 and further comprising second electrical circuitry in communication with said lower level electrode for stopping the motor upon the level of the liquid in the container contacting said lower level electrode.

3. The system in accordance with claim 2 wherein said second electrical circuitry comprises a resistor (R1), a transistor (Q1), said resistor (R3), and ground.

4. The system in accordance with claim 3 wherein said first means comprises electrical circuitry including a resistor (R5), a transistor (Q2), a resistor (R6), and a switch (S2) for activating said motor in a second direction to move said valve to a closed position to allow gas pressure in the container to increase to urge the liquid level downwardly.

5. The system in accordance with claim 4 wherein said first means electrical circuitry is operative when the liquid level in the container drops below said free end of said upper level electrode, to stop current flow through said resistor (R5), turning off said transistor (Q2), which turns off said switch (S2), to stop said motor.

6. The system in accordance with claim 5 wherein said second means comprises electrical circuitry including said resistor (R1) turning off said transistor (Q1), causing current to flow through said resistor (R3), said transistor (Q3), and said switch (S1) to start said motor turning in said first direction to open said valve to decrease gas pressure in said container and thereby allow the liquid level to rise.

7. A system for monitoring and controlling the level of liquid in a closed container in which a gas is bubbled up through the liquid, the system comprising:

a block for mounting at an upper end of the container;

a turn-on electrode for extending from said block vertically into the container and of a first length;

a common electrode for extending from said block vertically into the container and of said first length;

a lower level electrode for extending from said block vertically into the container and of a second length shorter than said first length;

an upper level electrode for extending from said block vertically into the container and of a third length shorter than said second length;

a valve for venting the gas from the container;

a motor for driving said valve;

first means operative upon the liquid in the container reaching free ends of said turn-on electrode and said common electrode, to turn on said motor and activate said motor to turn on a first direction to move said valve toward an open position to vent the gas from the container;

a second means operative upon the liquid in the container reaching a free end of said lower level electrode to turn off said motor leaving said valve in an open position; and third means operative upon the liquid in the container reaching a free end of said upper level electrode, to turn on said motor and activate said motor to turn in a second direction to move said valve to a closed position, to allow gas pressure in the container to increase to push the level of the liquid in the container toward said lower level electrode free end;

whereby upon the liquid in the container dropping from contact with said upper level electrode, said third means is operative to stop said motor; and whereby upon the liquid in the container dropping from contact with said lower level electrode said second means is operative to start said motor and activate said motor to turn in said first direction to move said valve toward an open position to vent the gas from the container to reduce gas a pressure in the container, to permit the liquid therein to rise;

wherein said first means comprises a resistor (R4); a transistor (Q3) turned on by said resistor (R4), current through said resistor (R4) being operative to flow through (R3), and through said transistor (Q3) to a switch (S1) which is operative for said turning on of said motor and said activating of said motor in a first direction to move said valve toward an open position.

8. The system in accordance with claim 7 wherein said second means comprises a resistor (R1) through which current flows when the liquid level engages said free end of said lower level electrode to turn on a transistor (Q1), permitting current to flow through said resistor (R3) and through said transistor (Q1) to ground to initiate said turning off of said motor.

9. The system in accordance with claim 8 wherein said third means comprises a resistor (R5) through which current flows when the liquid level engages said free end of said upper level electrode, a transistor (Q2) turned on by current flowing through said resistor (R5), a resistor (R6) through which current from said transistor (Q2) flows, and a switch (S2) through which current from said transistor (Q2) flows for said activation of said motor for said moving of said valve to said closed position.

10. The system in accordance with claim 9 wherein when the liquid level drops from contact with said upper level electrode, current ceases to flow through said resistor (R5), to turn off said transistor (Q2), to turn off said switch (S2) to stop said motor.

11. The system in accordance with claim 10 wherein said liquid level dropping from contact with said lower level electrode stops flow of current to said resistor (R1), to turn off said transistor (Q1), to flow current through said resistor (R3), said transistor (Q3), and said switch (S1) for said activation of said motor.

12. The system in accordance with claim 11 and further comprising a power source in communication with said motor and said switches, and wherein dropping of the liquid level from contact with said turn-on and common electrodes operates to interrupt communication between said power source and said motor and to turn off said motor leaving said valve in an open position.

* * * * *